United States Patent
Kathuria et al.

(10) Patent No.: US 9,906,589 B2
(45) Date of Patent: Feb. 27, 2018

(54) SHARED MANAGEMENT SERVICE

(71) Applicant: Facebook, Inc., Menlo Park, CA (US)

(72) Inventors: Vishal Kathuria, Palo Alto, CA (US); Vikas Mehta, Lynnwood, WA (US); Muthukaruppan Annamalai, Redmond, WA (US); Zhenhua Guo, Woodinville, WA (US)

(73) Assignee: Facebook, Inc., Menlo Park, CA (US)

( * ) Notice: Subject to any disclaimer, the term of this patent is extended or adjusted under 35 U.S.C. 154(b) by 599 days.

(21) Appl. No.: 14/542,106

(22) Filed: Nov. 14, 2014

(65) Prior Publication Data

US 2016/0142475 A1 May 19, 2016

(51) Int. Cl.
*G06F 15/16* (2006.01)
*H04L 29/08* (2006.01)
*H04L 29/06* (2006.01)

(52) U.S. Cl.
CPC .......... *H04L 67/1008* (2013.01); *H04L 67/10* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,783,763 B2 * | 8/2010 | Tuel | G06F 9/5033 709/201 |
| 9,130,990 B2 * | 9/2015 | Migault | H04L 29/12066 |
| 9,614,912 B2 * | 4/2017 | Shetty | H04L 67/1097 |
| 2014/0149794 A1 * | 5/2014 | Shetty | H04L 67/1095 714/20 |
| 2015/0207758 A1 * | 7/2015 | Mordani | H04L 47/78 709/226 |
| 2015/0348171 A1 * | 12/2015 | Vasantham | G06Q 30/0635 705/26.81 |
| 2015/0348172 A1 * | 12/2015 | Vasantham | G06Q 30/0635 705/26.81 |
| 2017/0206148 A1 * | 7/2017 | Mehta | G06F 11/203 |
| 2017/0293540 A1 * | 10/2017 | Mehta | G06F 11/2033 |

\* cited by examiner

*Primary Examiner* — Brian Whipple
(74) *Attorney, Agent, or Firm* — Perkins Coie LLP

(57) ABSTRACT

The disclosure is related to a shard manager that manages assignment of shards (data partitions) to application servers. An application service ("app service") provides a specific service to clients and can be executing on multiple application servers. The dataset managed by the app service can be divided into multiple shards and the shards can be assigned to different app servers. The shard manager can manage the assignment of shards to different app servers based on an assignment policy. The shard assignments can be published to a configuration service. A client can request the configuration service to provide identification information of the app server to which a particular shard the client intends to access is assigned. The shard manager can also provide dynamic load balancing solutions. The shard manager can poll the app servers in runtime to determine the load information and per-shard resource usage, and balance the load by reassigning the shards accordingly.

20 Claims, 12 Drawing Sheets

SHARED MANAGEMENT SERVICE

BACKGROUND

Some applications and application services ("application services" or "app services"), e.g., messaging applications, advertising applications, logging applications, games, can execute on an application platform, such as a social networking platform that provides a social networking application. In such configurations, application service developers develop the application services and configure them for use by users of ("deploy" them in) the social networking platform. The application services can be developed as per specifications required by the social networking platform. Although the social networking platform can provide an environment in which the application services can execute, some features, such as scalability, reliability, etc., may have to be factored in by the application service developers. As an example, the application service developers may have to program their services according to their preferences or requirements regarding these factors. Many social networking platforms do not provide such features, and those that provide them are inefficient, complex, not cost-effective, require significant development effort from the application service developers, etc.

For example, some social networking platforms that have millions of users and manage a significant amount of data associated with the users offer some data partitioning services to manage data efficiently. However, the data partitioning services often become inefficient over time. For example, the partitioning services can statically create data partitions ("shards"), and may not thereafter consider (a) load changes of the servers over time, (b) uneven load distribution on different partitions, and/or (c) uneven capacity of servers handling the partitions. The partitioning services can also be application service specific, e.g., different application services can have different partitioning services. As a result, the statically created data partitions can become "stale" and again cause various performance and network bandwidth inefficiencies.

DETAILED DESCRIPTION

Figure 1:
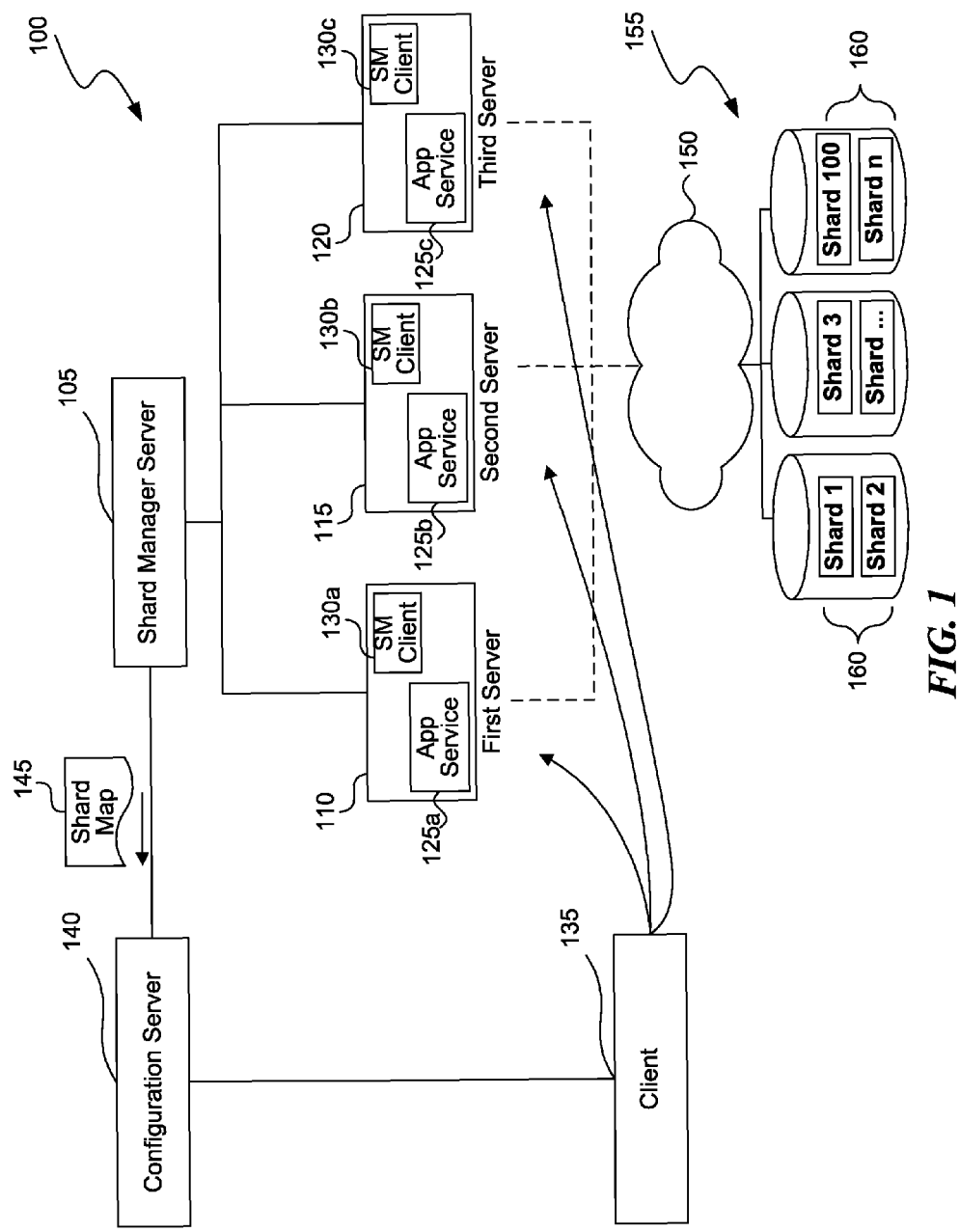
FIG. 1 is a block diagram illustrating an environment in which a shard manager can be implemented.

Disclosed are embodiments of a shard management service ("shard manager") that manages assignment of shards (e.g., data partitions) to application server computing devices ("app servers"). The shard manager can also include a load balancing service to monitor a load of the app servers and balance the load by updating the shard assignments. An application service ("app service") provides a specified service to client computing devices ("clients"). For example, a social networking application can enable users to share comments, messages, pictures (also, "photos"), etc. with one or more other users of the social networking application. The app service can be associated with a dataset. For example, the social networking application can be associated with a dataset such as user profile data of the users, pictures, messages, comments, etc., of the users. The dataset can be partitioned into partitions, each of which can be referred to as a shard. Each of the shards can contain a portion of the dataset, e.g., data of a subset of the users, a subset of the pictures, etc. The app service can execute on a number of app servers, e.g., to provide scalability, server to a number of clients.

The shard manager executes at a server computing device ("server"). In some embodiments, the shard manager is an "observer and coordinator" application that controls shard assignments to app servers. The shard manager initially registers the app service and identifies a service specification of the app service, e.g., provided by a user such as a developer of the app service. The service specification can include various information, e.g., name of the app service, identification (ID) of the app service, shards associated with the app service, load balancing policy, assignment policy, identification of a counter of an app server, which can provide load information and/or available capacity of the app server, resource requirement of each of the shards, etc., to identify the data requirements and service information for an application service. After obtaining the service specification, the shard manager assigns the shards to different app servers.

In some embodiments, the assignment policy can include locale-based assignment rules. The locale-based assignment rules ensure that a shard is assigned to an app server in a specified locale, e.g., geographical region. In some embodiments, the assignment policy can include network-distance based assignment rules, in which a set of shards are assigned to app servers within a specified region, e.g., geographical area. The set of shards can be associated with one or more app services. The network-distance based assignment rules can place the set of shards of the one or more app services close to each other, e.g., within a specified geographical region. For example, if the set of shards is associated with two or more app services, one of the app services can be considered as a source and the other app services can be considered as followers. The network-distance based assignment rules can assign the set of shards associated with the source app service and the follower app services to app servers within a common geographical region.

The shard manager can rebalance the load between various app servers by reassigning the shards to the app servers, e.g., dynamically as needed. The shard manager can complete this by adding and/or dropping shards assigned to an app server and/or moving shards between app servers. While the shard manager can ensure that an app server is not overloaded or under-utilized, in some embodiments, the shard manager also ensures that the utilization or a load of the app servers is uniform across the app servers hosting a particular app service. In some embodiments, the shard manager evaluates the resource requirement of each shard along with the app server capacity at runtime. Resource requirements can change at runtime because of multi-tenancy, partial hardware failures, etc. Using this information, the shard manager can determine which shards should be added, dropped and/or moved from various app servers and thereby helps keeps the utilization of the app servers even.

In some embodiments, the shard manager polls a pool of the app servers to obtain their load information or available capacity, e.g., as measured by counters of the corresponding app servers. In some embodiments, the counters can also provide per-shard resource requirements of the shards assigned to the app server. Based on the load information of the app server and the resource requirements of the shards, the shard manager determines whether to add, drop, and/or move the shards between the app servers.

The shard manager can publish (e.g., communicate) the shard assignments to a configuration service. Clients of the app service can then read (e.g., request) the shard assignments from the configuration service, obtain the address of the app server to which the shard the client is intending to access is assigned, and then send data access requests to the identified app server hosting the shards associated with the client. As described above, the shard can contain a subset of the dataset associated with the app service. The client, which "consumes" (e.g., utilizes) the app service, can be associated with one of the shards of the app service. For example, in the social networking app service, clients can be "front-end" servers that are configured to exchange data, e.g., messages, photos, user information, with users of the social networking application. The front-end servers can receive data from users and then send the data to the social networking app service to store the data in the database, e.g., in one of the shards. A first front-end server can receive data from users whose data is in a first shard and a second front-end server can receive data from users whose data is in a second shard. Consequently, the front-end servers may connect to different app servers to process the data. Accordingly, a front end-server contacts the configuration service to obtain the identification information of the app server ("app server ID"), e.g., Internet protocol (IP) address and a port number, to which the shard the front-end server is associated with is assigned. The front-end servers can also receive data from the social networking app service and provide the data to users.

In some embodiments, a single front-end server can issue requests for different sets of shards. Accordingly, a request to the configuration service from a front-end server can either include information regarding the shard the front-end server is attempting to access or information that can be used by the configuration service to identify the shard the front-end server is attempting to access. For example, if the request includes a user ID of the user of the social networking app service, the configuration service can determine the shard the front-end server is attempting to access based on the user ID. After identifying the shard, the configuration service can determine the app server to which the shard is assigned based on the shard assignments stored at the configuration service. After obtaining the identification information of the app server, the client sends a data access request to the identified app server for accessing the shard.

The shard manager supports additional load-balancing features, e.g., maintaining both primary and secondary app servers for each shard, transitioning out a primary server, electing and transitioning in a primary server, maintaining canary servers, and dynamic cloning of shards.

In some embodiments, each of the shards has one of the app servers as a primary server and one or more of the app servers as secondary app servers. The primary server can perform any of read or write operations, typically write operations, on the shards assigned to them. The secondary app servers may be restricted to performing only read operations on the shards assigned to them. In some embodiments, only one primary server is assigned to a shard, e.g., to avoid any data loss and/or inconsistencies in data that may be caused due to multiple writes by multiple primary servers on the same shard.

In some embodiments, having only one primary server makes maintenance operations cause downtime to the writers because, while the primary role is being moved from a current app server to another app server, e.g., due to an impending failure of the current app server, there may be no app server that can handle any write requests. Shard manager supports a "best effort graceful primary movement" feature that eliminates any downtime for the read/write clients. To solve this problem, the shard manager can coordinate the transition between the current primary app server and the new primary app server. During the transition, the old primary server "proxies" the write requests to the new primary server, thereby guaranteeing that there is only ever a single writer in the system.

In some embodiments, when new versions of binary code of the app service is deployed on the app servers, ensuring that there are no "regressions" (e.g., errors, failures, lapses) may not be easy in a dynamic system in which data loaded by the app server and requests it serves can change over time, e.g., due to different shards having been placed on the app server. A "canary" feature of the shard manager allows app service developers to freeze the set of shards assigned to the canary servers. The shards can remain on the canary servers as long as the canary servers are functioning. When a canary server becomes unavailable, e.g., due to a failure, the shards are failed over to other app servers, and when the canary server recovers, the set of shards are returned to the canary server, thereby restoring the environment and making it easier to compare the behavior of the app service across different versions of the app service. This can also be helpful to debug issues that are reproducible only under specific conditions.

In some embodiments, the shard manager supports dynamic cloning of the shards. The shards assigned to the app servers can have replicas, e.g., to provide reliability and minimize delay in responding to read requests. However, a trade-off in generating the replicas is storage space: replicas occupy additional storage. The shard manager observes the data traffic for a shard and increases or decreases the number of replicas of the shard based on the data traffic. If the shard is hot, e.g., the data traffic on the shard exceeds a specified threshold, the shard manager can increase the number of replicas for the shard. Similarly, if the shard is cold, e.g., the data traffic on the shard is below a specified threshold, the shard manager can decrease the number of replicas for the shard. The embodiments will now be described with reference to the Figures.

Environment

Turning now to the Figures, FIG. 1 is a block diagram illustrating an environment 100 in which the shard manager can be implemented. The environment 100 includes a shard manager 105 that facilitates management of shards 160 associated with an app service 125. The shard manager 105 can be implemented on a server. The app service 125 can have many instances executing on multiple app servers, e.g., a first instance 125a on a first app server 110, a second instance 125b on a second app server 115, and a third instance 125c on a third app server 120. The app service 125 can be any application that provides a specific service to its client computing server devices ("clients" or "client servers"), e.g., client 135. The client 135 can be a server that receives data access requests from the users of the social networking application.

Figure 2:
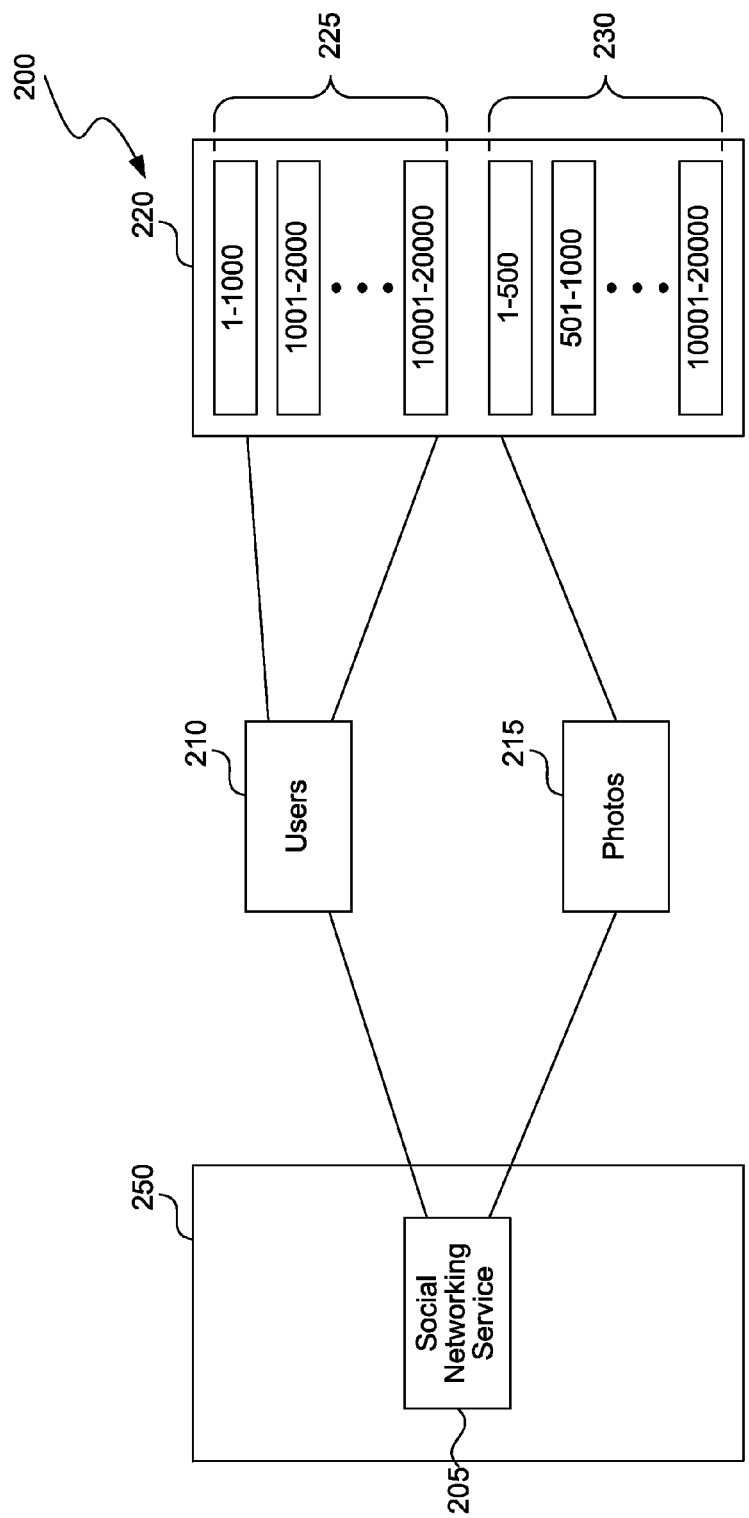
FIG. 2 is a block diagram illustrating an example of an app service and shards associated with the app service, consistent with various embodiments.

FIG. 2 is a block diagram illustrating an example 200 of an app service and shards associated with the app service, consistent with various embodiments. The example 200 illustrates a social networking app service 205 that provides a service such as managing user profile data, messages, comments, photos of users of the social networking application. As described above, the app service 125 can be associated with a dataset. For example, the social networking app service 205 can be associated with a dataset, which can include user profile data 210 of the users and pictures 215 of the users. The dataset can be partitioned into a number of shards, each of which can contain a portion of the dataset, For example, the user profile data 210 and pictures 215 associated with the users of the social networking app service 205 is partitioned into a first set of shards 225 and a second set of shards 230, respectively. Each of the shards in the first set of shards 225 can contain data of a subset of the users. For example, a first shard in the first set of shards 225 can contain data of first one thousand users, e.g., users with ID "1" to "1000" as illustrated in the example 200. Each of the shards in the second set of shards 230 can contain a subset of the pictures of the users. For example, a first shard in the second set of shards 230 can contain pictures associated with first five hundred users, e.g., users with ID "1" to "500" as illustrated in the example 200.

The social networking app service 205 executes on the app server 250. In some embodiments, the social networking app service 205 can be similar to the app service 125 of FIG. 1 and can execute on a number of app servers. In some embodiments, the app server 250 is similar to the app servers 110-120. In some embodiments, the first set of shards 225 and the second set of shards 230 can be similar to the shards 160.

Referring back to FIG. 1, the shards 160 can be stored in one or more storage devices 155. The storage devices 155 can be accessed via a communication network 150, e.g., Internet, intranet, local area network (LAN), wide area network (WAN). An app service can execute on multiple app servers, e.g., to minimize delay in processing data access requests from clients, to provide reliability in case of app server failures. In some embodiments, an app service executing on an app server can access only the shards that are assigned to that app server. The shard manager 105 facilitates the management of shards 160, e.g., assignment of shards 160 to the app servers 110-120, balancing load of the app servers, cloning of the shards, assignment of primary server and secondary servers to the shards, and provisioning of canary servers.

The shard manager 105 operates independent of the app service 125, e.g., the shard manager 105 can be used by any and many app services that are developed by various app service developers. The shard manager 105 provides an application, e.g., shard manager client 130, which includes an application programming interface (API) that can be implemented by the app service developers to facilitate the shard manager 105 to manage the shards 160. Some examples of the API include API for adding and/or dropping a shard. The app service 125 can specify the operations to be performed for adding and/or dropping a shard. The shard manager client 130 may have to be executed on each of the app servers, e.g., app servers 110-120, whose shard assignments have to be managed by the shard manager 105.

In some embodiments, the shard manager 105 is an external application that observes and coordinates the shard assignments to the app servers. The shard manager 105 watches the app servers for their load information and can react to ensure that shards 160 are always assigned to app servers that have a load below a specified threshold, and to ensure the utilization of the app servers is even.

After the shard assignments are made to the app servers 110-115, the shard manager 105 generates a shard map 145 that contains information regarding which shard is mapped to which app server. For example, the shard map 145 can contain a mapping of a shard ID of the shard to an app server ID of the app server to which the shard is assigned. The shard manager 105 publishes the shard map 145 to a configuration service 140. The configuration service 140 stores the shard map 145 and listens to requests from clients for identification information of app servers. A client, e.g., client 135, intending to access the app service, requests the configuration service 140 for identification information of the app server by providing a shard ID or some other identification information using which the shard the client is associated with can be identified by the configuration service 140. The configuration service 140 determines from the shard map 145, the app server to which the shard is associated, and returns the identification information of the app server to the client. In some embodiments, the identification information of the app server includes IP address and port of the app server. After obtaining the identification information of the app server, the client 135 sends the data access request to the identified app server.

Figure 3A:
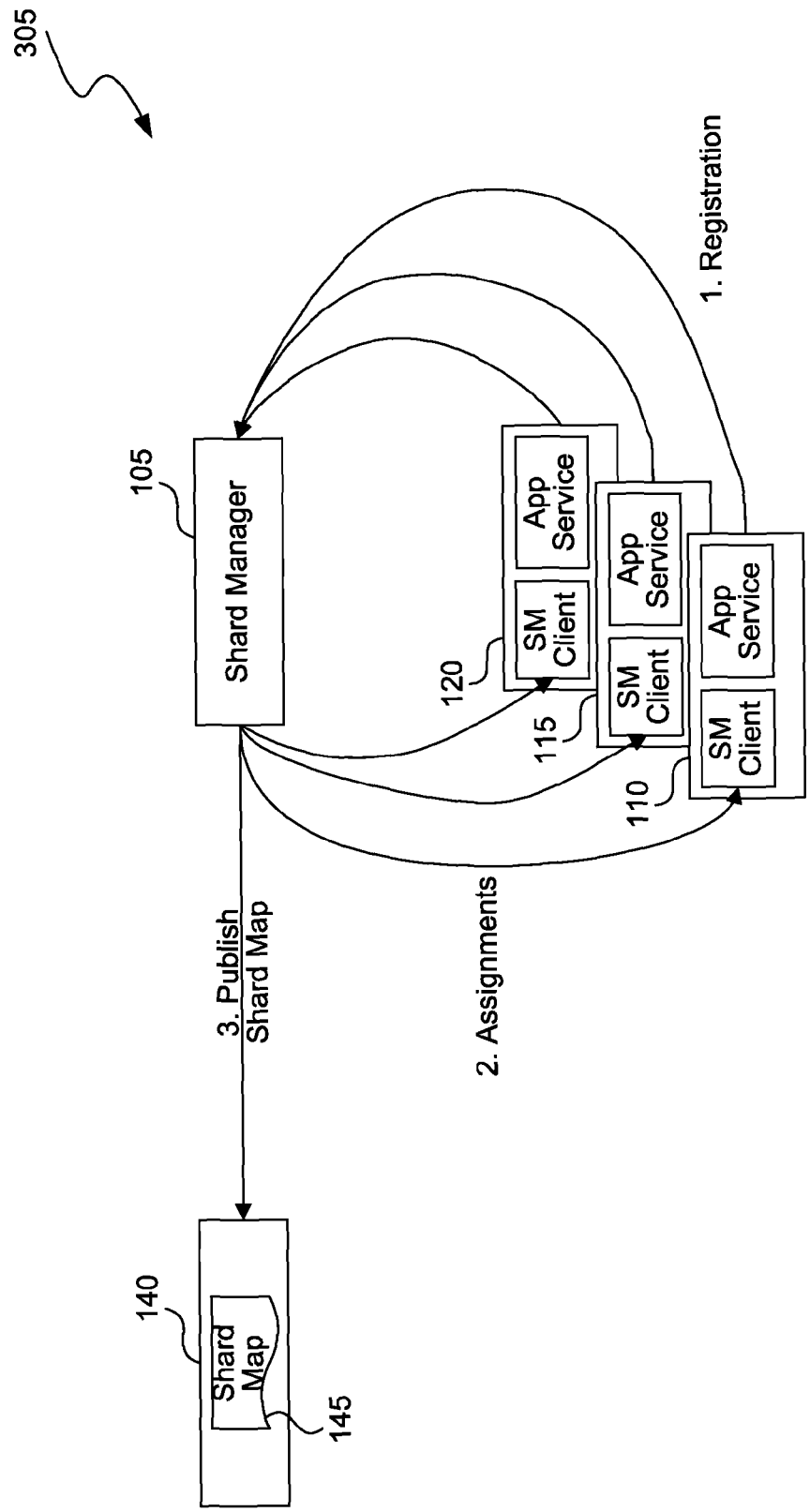
FIG. 3A is a block diagram of a process for assigning shards to app servers, consistent with various embodiments.
Figure 3B:
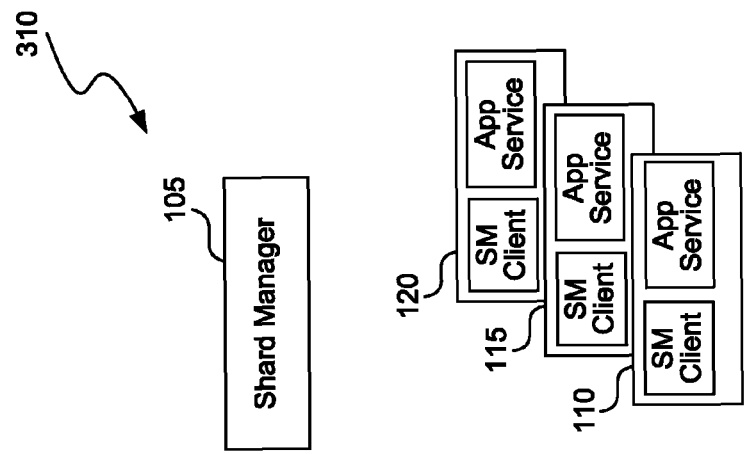
FIG. 3B is a block diagram of process for obtaining identification information of an app server to which a particular shard is assigned from a configuration service, consistent with various embodiments.
Figure 3B:
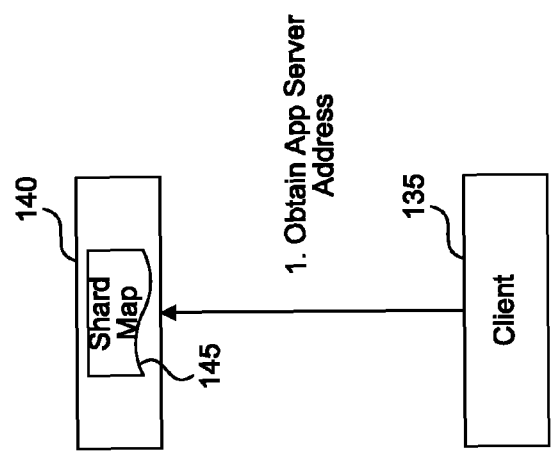
Figure 3C:
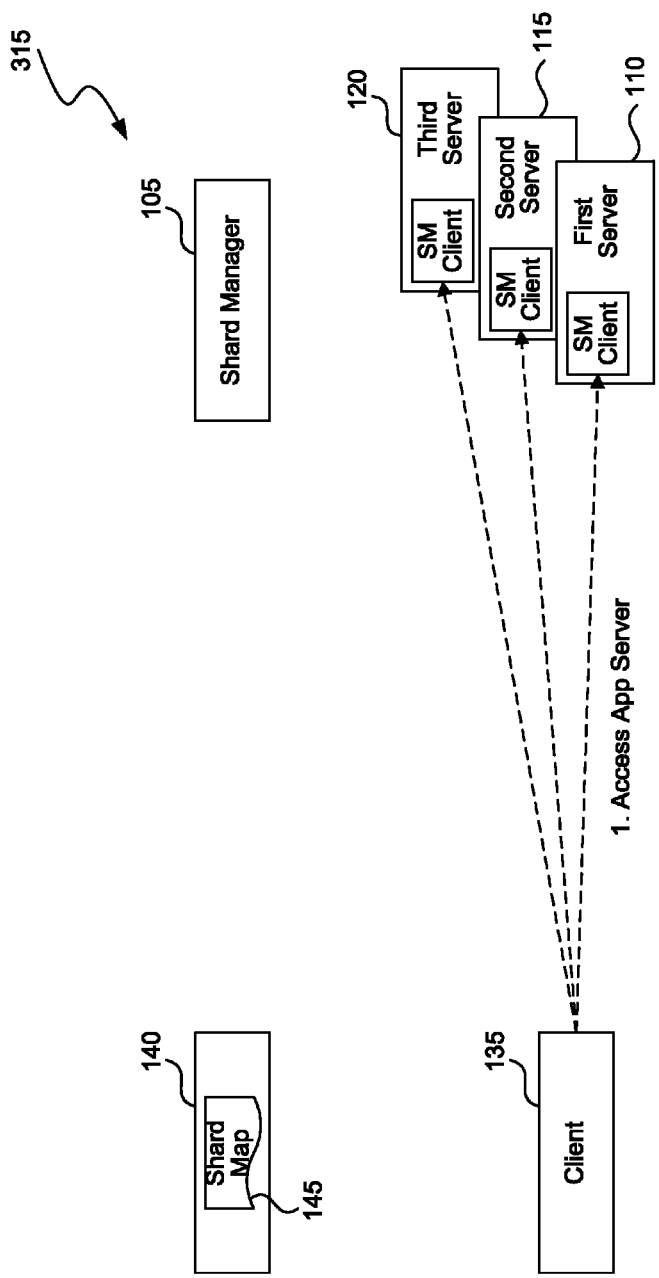
FIG. 3C is a block diagram of a process for requesting the app server to process a data access request for a particular shard, consistent with various embodiments.

FIGS. 3A-3C, collectively referred to as FIG. 3, is a block diagram of a process for assigning shards to app servers, consistent with various embodiments. In some embodiments, the process may be implemented in the environment 100 of FIG. 1. An app server sends a registration request to the shard manager 105 indicating that an app service intends to obtain the services of the shard manager 105 for managing the shards of the app service. In some embodiments, the app server can send the registration request to the shard manager 105 when the app service starts executing on the app server. Further, if the app service executes on multiple app servers, e.g., app server 110-120, each of the app servers 110-120 can send the registration request to the shard manager 105. The shard manager 105 registers the app service 125 and identifies a service specification of the app service 125.

The service specification can include a variety of information, e.g., name of the app service 125, app service ID, shards associated with the app service 125, load balancing policy, assignment policy, identification of a counter of an app server. In some embodiments, the counter measures the load information of the app server and provides a value indicating the load and/or available capacity of the app server, a value indicating the resource requirement of each of the shards, etc. The service specification can be defined by a user, e.g., a service developer of the app service 125. In some embodiments, the app service may provide the service specification as part of the registration process.

After obtaining the service specification, the shard manager 105 assigns the shards to the app servers 110-120. The shard manager 105 can assign the shards to the app servers 110-120 based on the assignment policy defined by the service developer. In some embodiments, the assignment policy can include locale-based assignment rules. The locale-based assignment rules ensure that a particular shard of the app service 125 is assigned to an app server in a specified locale, e.g., geographical region. In some embodiments, the assignment policy can include network-distance based assignment rules, where a set of shards are assigned to app servers within a specified region, e.g., geographical area. The set of shards can be associated with one or more app services. The network-distance based assignment rules considers placing the set of shards of the one or more app services as close to each other, e.g., assign to app servers within a specified geographical region. For example, if the set of shards are associated with two or more app services, one of the app services can be considered as a source and the other app services can be considered as followers. The network-distance based assignment rules assigns the set of shards associated with the source app service and the follower app services to app servers within a specified geographical region.

After the shard manager 105 assigns the shards to the app servers 110-120, the shard manager generates a shard map 145 that contains a mapping of the shards to the app servers. The shard map 145 contains information regarding which shard is mapped to which app server. For example, the shard map 145 contains a mapping of the shard ID of the shard to an app server ID of the app server to which the shard is assigned. The shard manager 105 then publishes the shard map 145 to the configuration service 140. The shard manager 105 updates the shard map 145 as and when the shard assignment changes, e.g., when a shard is added to or dropped from an app server and/or when a shard is moved from one app server to another app server.

FIG. 3B is a block diagram of a process for obtaining identification information of an app server to which a particular shard is assigned from a configuration service, consistent with various embodiments. A client, e.g., client 135, who consumes the app service, e.g., app service 125, may not be aware of the shard assignments and therefore, may not know which app server the client 135 should contact for having a data access request processed. Accordingly, the client 135 requests the configuration service 140 to provide the identification information of the app server. The client 135 typically issues a data access request for a particular shard. In some embodiments, while requesting the configuration service 140 for the identification information of the app server, the client 135 includes information regarding the shard which the client 135 is intending to access or information that can be used by the configuration service 140 to determine the shard the client 134 is intending to access.

After the shard ID is identified, the configuration service 140 determines the app server to which the shard having the identified shard ID is mapped, using the shard map 145. The configuration service 140 then returns the identification information of the app server to the client 135. In some embodiments, the identification information can include the IP address and the port number of the app server.

FIG. 3C is a flow diagram of a process for requesting the app server to process a data access request for a particular shard, consistent with various embodiments. After obtaining the app server ID, the client sends the data access request to one of the app servers 110-120. The data access request can be any of a read request to read data from the shard or a write request to write data to the shard.

Figure 4:
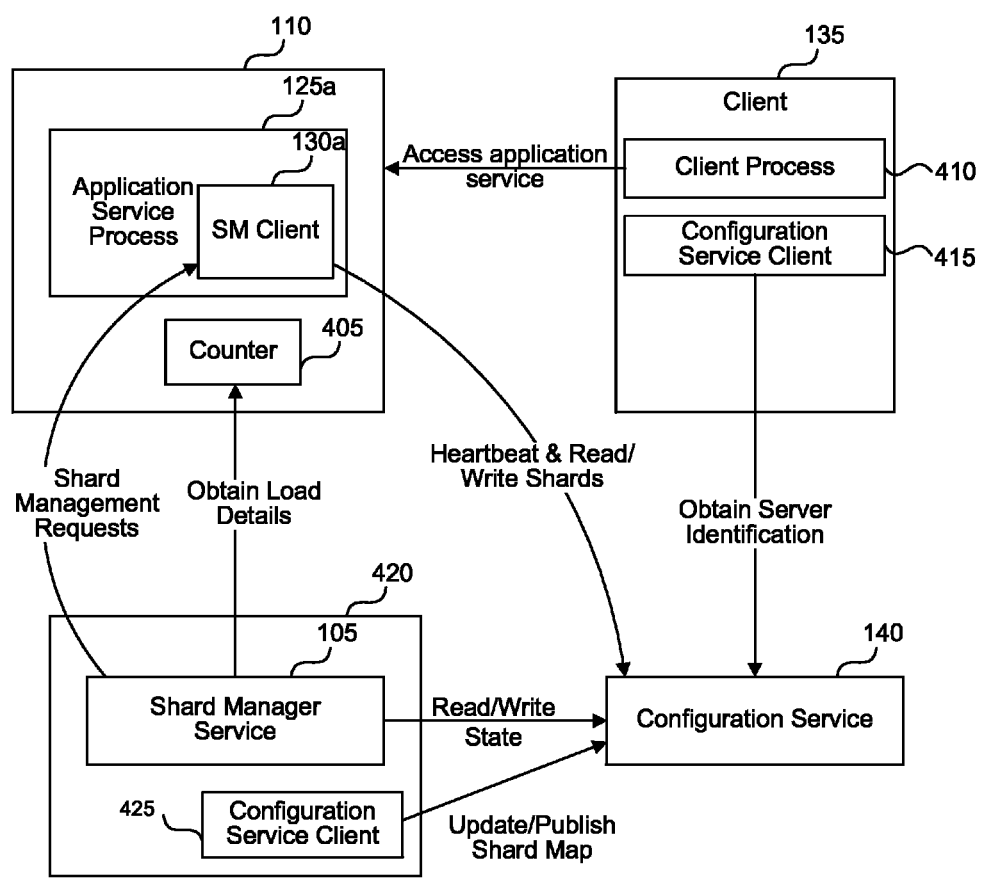
FIG. 4 is a block diagram of a system illustrating an implementation of a shard manager, consistent with various embodiments.

FIG. 4 is a block diagram of a system 400 illustrating an implementation of a shard manager, consistent with various embodiments. The system 400 can be implemented in environment 100 of FIG. 1. The system 400 includes a shard manager 105, which can be executed as a process in a shard manager server 420. The shard manager 105 manages the assignment of the shards to an app service 125a executing on an app server 110. A shard manager client 130a executing on the app server 110 allows the shard manager 105 to facilitate assigning the shards to the app server 110. The process of assigning the shards can include adding or dropping a shard from the app server 110 and/or moving the shard from the app server 110 to another app server. The adding, dropping and/or moving of the shards can include various operations and some of them can be dependent on the app service 125a. The shard manager client 130a provides an API that can be implemented by the app service 125a. For example, the shard manager client 130a provides an API for adding a shard to the app server 110, and the app service 125a can use the API to specify the operations to be performed for adding a shard. When the shard manager 105 determines to add, drop and/or move the shards, the shard manager 105 performs a call back to the shard manager client 130a to invoke and execute the corresponding API.

Similarly, the app service 125a can implement various such APIs provided by the shard manager 105. Some of the APIs may have a default implementation provided by the shard manager 105, which can be further customized by the app service 125a.

The shard manager 105 stores the assignments of the shards to the app server 110 as a shard map in the configuration service 140. The shard manager server 420 includes a configuration service client 425 that facilitates the communication between the shard manager server 420 and the configuration service 140. The shard manager server 420 publishes the shard map to the configuration service 140 via the configuration service client 425.

The client server 135 includes a client process 410 that generates various data access requests for accessing the shards assigned to the app server 110. The client server 135 includes a configuration service client 415 that facilitates the communication between the client process 410 and the configuration service 140, e.g., for obtaining the identification information of an app server to which a particular shard the client process 410 is intending to access is assigned. After obtaining the identification of the app server, e.g., app server 110, the client process 410 sends a request to the app server 110 for accessing the particular shard. The app service 125a receives the request and process the request by accessing the particular shard. In some embodiments, the app service 125a accesses the shards using the shard manager client 130a.

In some embodiments, the shard manager 105 assigns the shards to the app servers dynamically, e.g., in runtime. The shard manager 105 monitors the load on the app servers 110-120 and resources used and/or required by each of the shards on the app servers and determines whether to update the assignment of shards so that a load of an overloaded app server decreases, the load of an under-loaded app server increases, and/or the load across a set of app servers is made even and uniform.

In some embodiments, the shard manager 105 obtains the load information of the app servers, e.g., app server 110, by polling a counter 405 of the app server 110. The counter 405 is configured to measure the load or available capacity of the app server and resources consumed by each of the shards assigned to the app server 110. The counter 405 provides a value indicating the load (or available capacity) of the app server 110 and another value indicating the resources consumed by each of the shards. In some embodiments, the counter 405 determines the load as a function of CPU utilization, memory utilization, disk utilization, etc. Further, the counter 405 can determine the load at a physical system level of the app server 110, at an operation system level of the app server 110, and/or at a process level, e.g., app service 125a, of the app server 110. In some embodiments, the app service 125a determines how the load is calculated by the counter 405, and provides the identification information of the counter 405 to the shard manager 105, e.g., as part of the service specification. The shard manager 105 just polls the counter 405 to obtain the load information of the app server 110 and the resource consumption of the shards.

The resource usage of the shards can also be determined as a function of one or more of CPU utilization, memory utilization, disk utilization, etc. of requests that access a particular shard. In some embodiments, the counter may not be able to provide resource usage of the shards, e.g., when the app service has just started and the shards are not assigned to any app server yet. In such cases, the shard manager 105 can obtain the resource requirements of a shard from the load balancing policy provided as part of the service specification. The app service developer can define the resource requirement of the shards in the load balancing policy.

Based on the load information of the app server 110 and the resource requirement of the shards, the shard manager 105 determines whether to add, drop, and/or move the shards between the app servers. The shard manager 105 can perform the load balancing operations based on the load balancing policy specified in the service specification of the app service 125a. For example, the app service 125a can specify that a load in a particular app server may not exceed a first threshold. In another example, the app service 125a can specify that an average load across the app servers may not exceed a second threshold. In another example, the app service 125a can specify a minimum amount of capacity to be available on an app server for adding a shard to the app server etc.

The shard manager 105 can poll the counter based on a specified condition, e.g., at regular intervals, when the load of any of the app servers 110-120 exceeds the first threshold or drops below another threshold, when the data traffic on a particular shard exceeds a specified threshold. In some embodiments, in reassigning the shards to balance the load, the shard manager 105 ensures that the assignment policy specified as part of the service specification is complied with. For example, when a shard is moved from one app server to another app server, the shard manager 105 ensures that any locale-based assignment policy defined for the shard is complied with.

In some embodiments, each of the shards in the system 400 is associated with a primary server and one or more secondary servers. The primary server can perform any of read or write operations, typically write operations, on the shards assigned to them. The secondary app servers are restricted to performing only read operations on the shards assigned to them. In some embodiments, only one primary server is assigned to a shard, e.g., to avoid any data loss and/or inconsistencies in data that may be caused due to multiple writes by multiple primary servers on the same shard. In some embodiments, the configuration service 140 facilitates the selection of one of the app servers as the primary server for a shard. The configuration service 140 can consider various factors, e.g., a load of the app server, a response time of the app server, in electing a particular app server as the primary server.

In some embodiments, having only one primary server makes maintenance operations cause downtime to the writers because while the primary role is being moved from current app server to another app server, e.g., due to an impending failure of the current app server, there is no app server that can handle any write requests. The shard manager 105 supports best effort graceful primary movement, e.g., transitioning the primary role from one app server to another app server without any downtime and without causing any data inconsistencies, which eliminates any downtime for the read/write clients. The shard manager 105 coordinates the transition between the current primary app server and the new primary app server. During the transition, the old primary server can proxy the write requests to the new primary app server ensuring a single writer in the system 400.

In some embodiments, the app server 110 sends a heart-beat signal to the configuration service 140, e.g., at specified intervals, indicating that the app server 110 is functioning normally. If the configuration service 140 does not receive the heart beat signal from the app server 110 for a specified duration, the configuration service 140 can consider that the app server 110 has failed or is failing and therefore can become unavailable. The configuration service 140 notifies this to the shard manager 105, e.g., via the configuration service client 425. The shard manager 105 prepares to reassign the shards assigned to the app server 110 to one or more of the remaining app servers. Further, if the app server 110 is designated as a primary server to one or more of the shards, the configuration service 140 can also elect another primary server for those shards.

In some embodiments, the shard manager 105 facilitates the use of app servers as canary servers. When new versions of binary code of the app service are installed on the app servers, ensuring there are no regressions may not be easy in a dynamic system. The shard manager 105 includes a canary feature that allows the app service developers to freeze the set of shards assigned to the canary servers, e.g., app servers on which a new version of the app service 125a is being executed. The shards stay on the canary servers as long as they are alive. When a canary server becomes unavailable, e.g., due to a failure, the shards are failed over to other app servers, and when the canary server recovers, the set of shards are assigned back, there by restoring the environment and making it easier to compare the behavior of the app service across different versions of the app service.

In some embodiments, the shard manager 105 supports dynamic cloning of the shards. The shards assigned to the app servers can have replicas, e.g., to provide reliability, minimize delay in responding to read requests. However, the trade-off in generating the replicas is the storage space. The shard manager 105 observes the data traffic for a shard and increases or decreases the number of replicas of the shard based on the data traffic. If the shard is hot, e.g., the data traffic on the shard exceeds a specified threshold, the shard manager 105 can increase the number of replicas for the shard. Similarly, if the shard is cold, e.g., the data traffic on the shard is below a specified threshold, the shard manager can decrease the number of replicas for the shard.

In some embodiments, multiple instances of shard manager 105 can be executing on different shard manager servers, e.g., to provide a fail-safe design. If one instance of the shard manager fails, then the system 400 fails over to another instance of the shard manager executing on another shard manager server. The shard manager 105 may save the state of the shard manager 105 containing various information, e.g., regarding shard assignments, to the configuration service 140. If the current shard manager fails, a new shard manager can read the state from the configuration service 140 and control the further assignments. However, if no shard manager is available, e.g., due to a failure, the shard assignments made by the shard manager 105 remains intact, that is, unchanged. However, shards may not be added, dropped and/or moved dynamically. In such cases, the app service developer can statically assign shards to the app servers.

Figure 5:
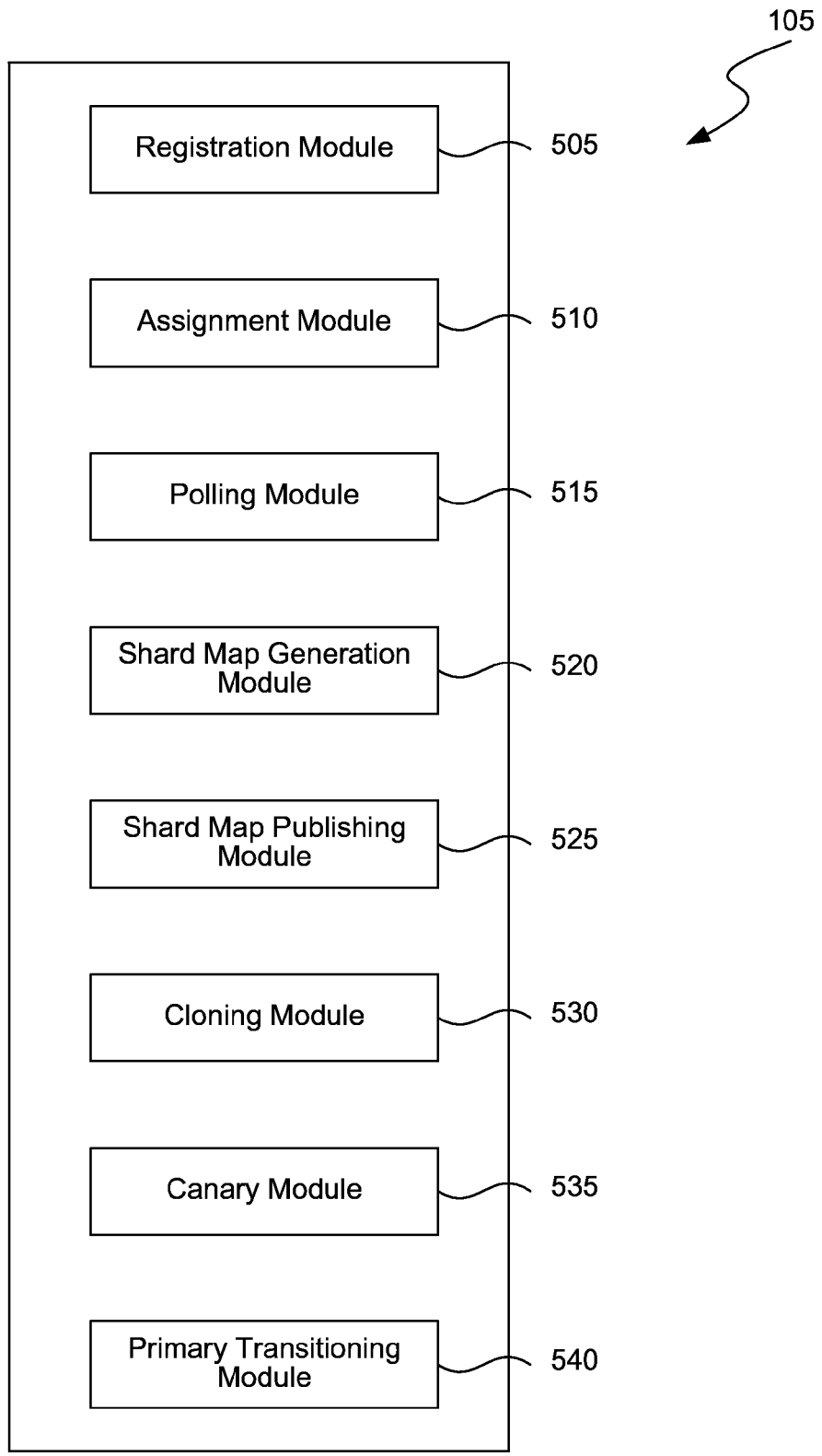
FIG. 5 is a block diagram of the shard manager of FIG. 1, consistent with various embodiments.

FIG. 5 is a block diagram of the shard manager of FIG. 1, consistent with various embodiments. The shard manager 105 includes a registration module 505 that receives registration requests from the app services and registers the app service, as described at least with reference to FIGS. 1 and 3A-3C. The shard manager 105 includes an assignment module 510 that facilitates assignment of the shards to app servers, as described with reference to at least FIGS. 1 and 3A-3C. The shard manager 105 includes a polling module 515 that polls the app servers to obtain the load information of the app servers and the resource usage by the shards, as described with reference to at least FIGS. 1 and 4. The information obtained from the polling module 515 can be used by the assignment module 510 to reassign the shards to the app servers.

The shard manager 105 includes a shard map generation module 520 to generate a shard map, e.g., shard map 145, that contains information regarding which shard is mapped to which app server, as described with reference to at least FIGS. 1 and 3A-3C. The shard manager 105 includes a shard map publishing module 525 that publishes the shard map to a configuration service, e.g., configuration service 140, from which a client intending to access a particular shard can obtain identification of the app server to which the particular shard is assigned.

The shard manager 105 includes a cloning module 530 that facilitates dynamic cloning of shards, as described with reference to at least FIG. 4. The shard manager 105 includes a canary module 535 that facilitates provisioning of an app server as a canary server, as described with reference to at least FIG. 4. The shard manager 105 includes a primary transitioning module 540 that facilitates transitioning of an old primary app server to a new primary app server without causing any downtime, as described with reference to at least FIG. 4. Additional details with respect to the above modules are described with reference to FIGS. 6 to 9 below.

Figure 6:
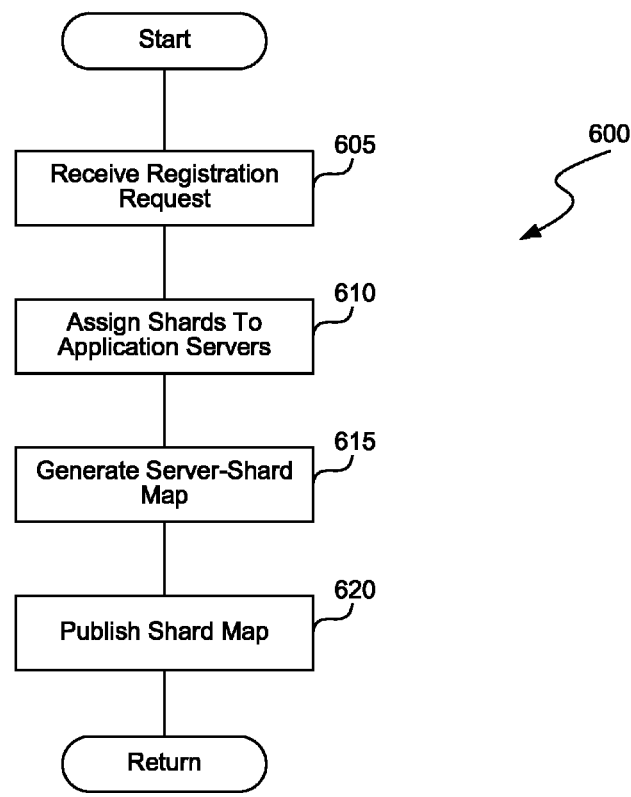
FIG. 6 is a flow diagram of a process for assigning shards to an app server, consistent with various embodiments.

FIG. 6 is a flow diagram of a process 600 for assigning shards to an app server, consistent with various embodiments. The process 600 may be executed in an environment 100 of FIG. 1. At block 605, the registration module 505 of the shard manager 105 receives a registration request from an app service, e.g., app service 125a, executing on an app server, e.g., app server 110. In some embodiments, the request includes a service specification of the app service. The service specification can include a variety of information, e.g., name of the app service, app service ID, shards associated with the app service, load balancing policy, assignment policy, identification of a counter of an app server.

At block 610, the assignment module 510 assigns the shards to the app server. The assignment module 510 can assign the shards to the app server based on the assignment policy defined by the service developer. In some embodiments, the assignment policy can include locale-based assignment rules. The locale-based assignment rules ensure that a particular shard of the app service 125 is assigned to an app server in a specified locale, e.g., geographical region. In some embodiments, the assignment policy can include network-distance based assignment rules, where a set of shards are assigned to app servers within a specified region, e.g., geographical area. The set of shards can be associated with one or more app services. The network-distance based assignment rules considers placing the set of shards of the one or more app services as close to each other, e.g., assign to app servers within a specified geographical region.

At block 615, after the assignment module 510 assigns the shards to the app server 110, the shard map generation module 520 generates a shard map, e.g., shard map 145, that contains a mapping of the shards to the app server. The shard map 145 contains information regarding which shard is mapped to which app server.

At block 620, the shard map publishing module 525 publishes the shard map to a configuration service, e.g., the configuration service 140, from which a client intending to access a particular shard can obtain identification of the app server to which the particular shard is assigned.

Figure 7:
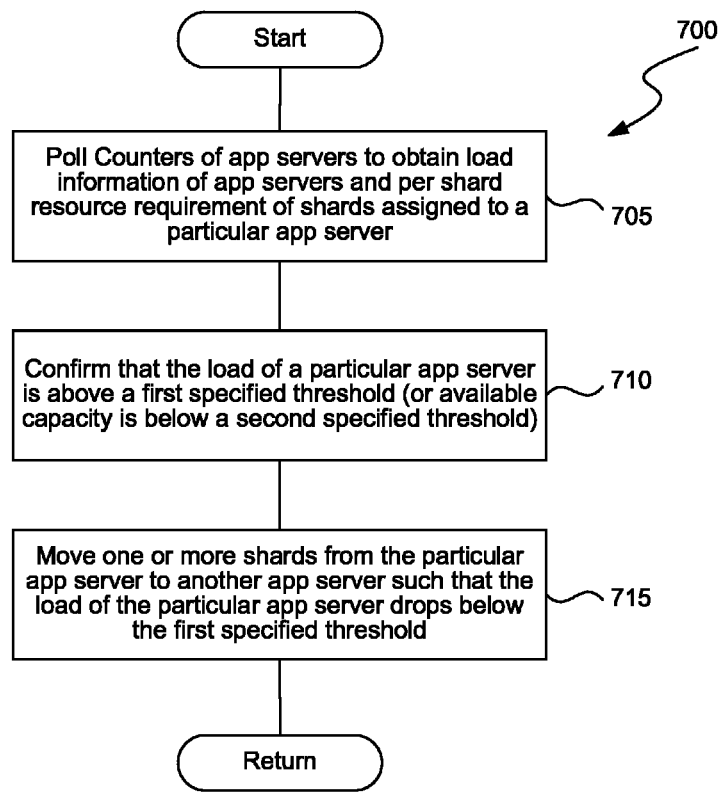
FIG. 7 is a flow diagram of a process for balancing load between app servers, consistent with various embodiments.

FIG. 7 is a flow diagram of a process 700 for balancing load between app servers, consistent with various embodiments. The process 700 may be executed in an environment 100 of FIG. 1. At block 705, the polling module 515 polls the counter, e.g., counter 405, of the app servers, e.g., app servers 110-120, to obtain the load information of the app servers and the resource usage by each of the shards assigned to the app servers. In some embodiments, the counter 405 measures the load of the app server as a function of CPU utilization, memory utilization, disk utilization, etc. Further, the counter can determine the load at a physical system level of the app server, at an operation system level of the app server, and/or at a process level of the app server 110. The resource usage of the shards can also be determined as a function of one or more of CPU utilization, memory utilization, disk utilization, etc. of requests that access a particular shard. In some embodiments, the app service determines how the load is calculated by the counter, and provides the identification information of the counter to the shard manager 105, e.g., as part of the service specification. The shard manager 105 just polls the counter 405 to obtain the load information of the app server 110 and the resource consumption of the shards.

At block 710, the assignment module 510 confirms that the load of a particular app server is above a first specified threshold (or available capacity at the app server is below a second specified threshold).

At block 715, the assignment module 510 determines to move one or more of the shards from the particular app server to another app server such that the load of the particular app server drops below the first specified threshold. In some embodiments, in moving the shards from the particular app server to another app server to balance the load, the assignment module 510 ensures that the assignment policy specified as part of the service specification is complied with. For example, when a shard is moved from one app server to another app server the shard manager 105 ensures that any locale-based assignment policy defined for the shard is complied with.

In some embodiments, moving a shard from a source app server to a destination app server includes identifying a shard that can be dropped from the source app server and identifying a destination app server to which the identified shard can be added without having the load of the destination app server exceed a specified threshold. The following paragraphs describe the process of moving the shard in greater detail.

Figure 8:
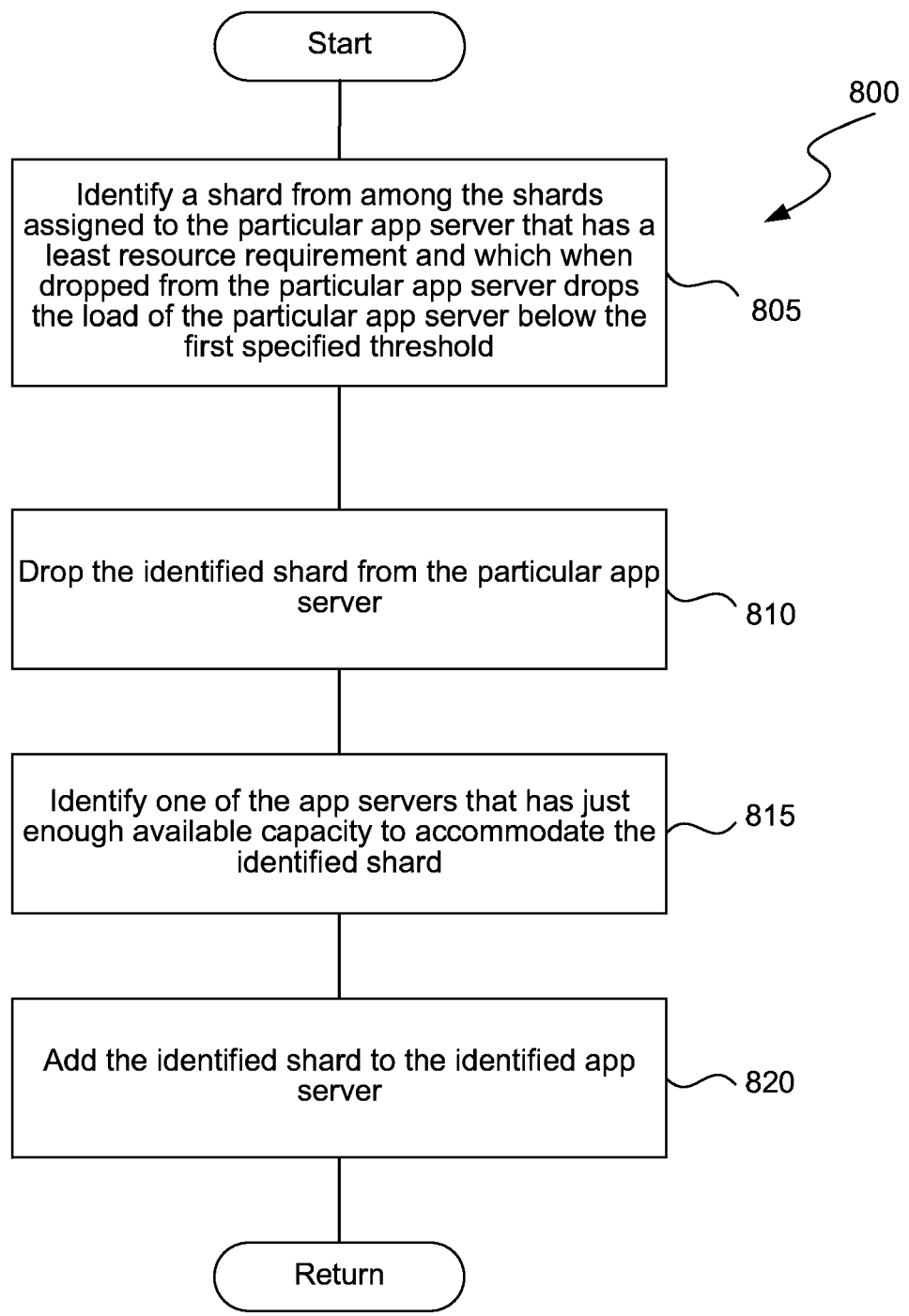
FIG. 8 is a flow diagram of a process for moving a shard from a source app server to a destination app server, consistent with various embodiments.

FIG. 8 is a flow diagram of a process 800 for moving a shard from a source app server to a destination app server, consistent with various embodiments. The process 800 may be executed in the environment 100 of FIG. 1. In some embodiments, the process 800 can be part of block 715 of process 700. At block 805, the assignment module 510 identifies a shard that has a least resource requirement or resource usage among the shards assigned to the source app server which when dropped decreases the load of the source app server below the first specified threshold as the target shard.

In some embodiments, the assignment module 510 identifies the target shard by arranging the shards assigned to the source app server in ascending order of the resource requirement and/or resource usage of the shards. The assignment module 510 examines each of the shards in the ordered set starting from the shard that has the least resource requirement to determine whether the load of the source app server drops below the first specified threshold when the corresponding shard is dropped and selects a shard which when dropped decreases the load of the source app server below the first specified threshold as the target shard.

At block 810, the assignment module 510 drops the target shard from the source app server.

At block 815, the assignment module 510 identifies the destination app server to which the target shard can be added without having the load of the destination app server exceed a specified threshold. In some embodiments, the assignment module 510 identifies one of the app servers that has just enough available capacity to accept the target shard without having its load exceed the specified threshold as the destination app server.

At block 820, the assignment module 510 adds the target shard to the destination app server.

Note that although the above process is described with reference to moving one shard, the process 800 can be implemented for moving multiple shards. Also, note that different app servers can be of different configurations, e.g., processing capacity, different memory capacity, different disk capacity, and accordingly can have different thresholds set for determining whether a particular app server is underloaded, overloaded, etc.

Figure 9:
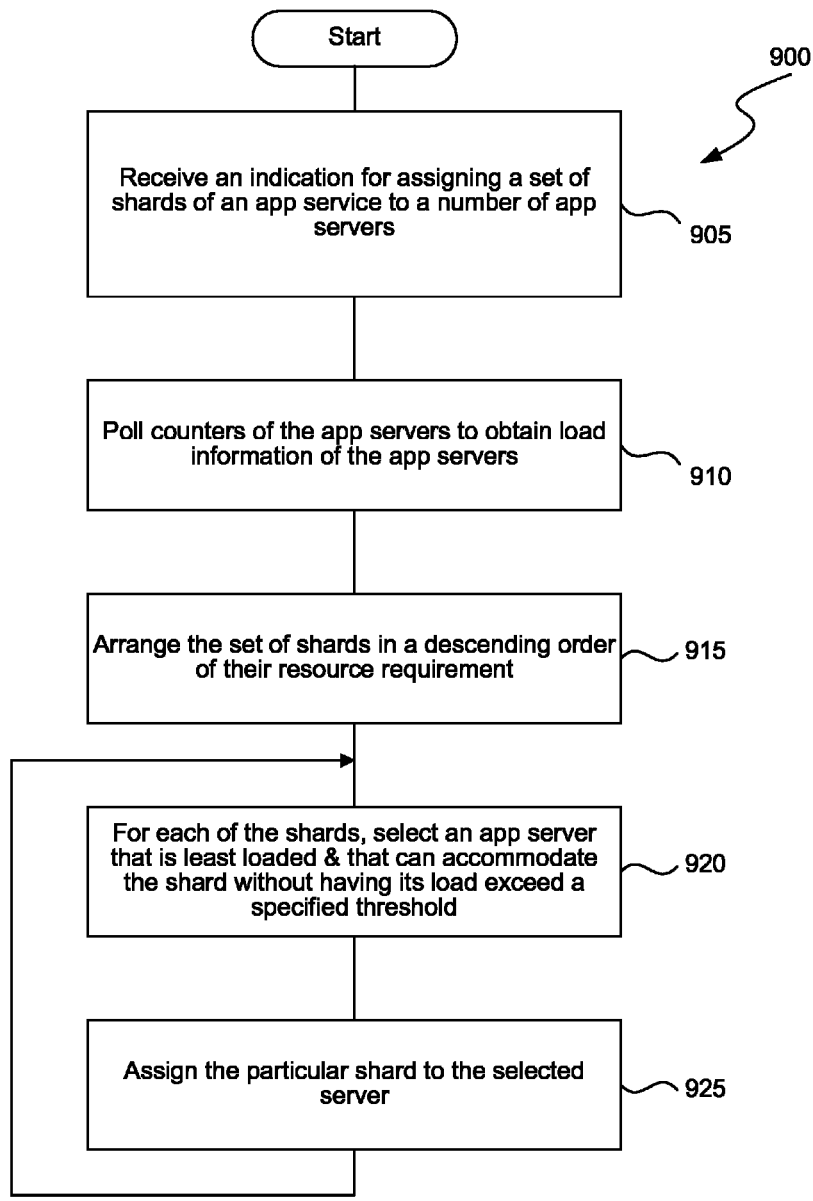
FIG. 9 is a flow diagram of a process for adding a set of shards to app servers, consistent with various embodiments.

FIG. 9 is a flow diagram of a process 900 for adding a set of shards to app servers, consistent with various embodiments. The process 900 may be executed in the environment 100 of FIG. 1. In some embodiments, the process 900 is executed when an app service has a new set of shards that need to be assigned to the app servers, e.g., app servers 110-120. At block 905, the assignment module 510 receives an indication that the app service has a set of shards that need to be assigned to one or more of the app servers.

At block 910, the polling module 515 polls the counters of the app servers to obtain the load information of the app servers.

At block 915, the assignment module 510 arranges the set of shards in a descending order of their resource requirement. In some embodiments, the counter may not be able to provide resource usage of the set of shards as the set of shards is not assigned to any app server yet. In such cases, the assignment module 510 can obtain the resource requirements of the set of shards from the load balancing policy provided as part of the service specification. The app service developer can define the resource requirement of the shards in the load balancing policy.

For each of the ordered set of shards starting from the shard that has the highest resource requirement, the assignment module 510 identifies (block 920) an app server that is (a) least loaded and (b) can accept the corresponding shard without having the load of the app server exceed a specified threshold, and assigns (block 925) the corresponding shard to the identified app server.

Figure 10:
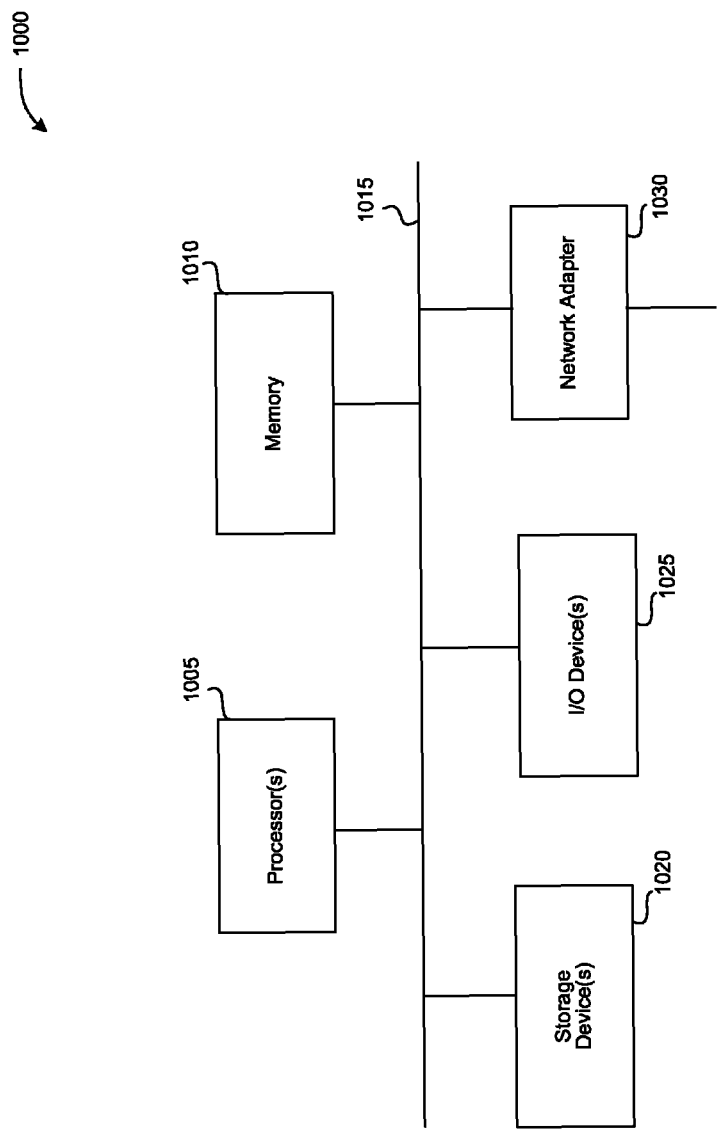
FIG. 10 is a block diagram of a computer system as may be used to implement features of some embodiments.

FIG. 10 is a block diagram of a computer system as may be used to implement features of some embodiments of the disclosed technology. The computing system 1000 may be used to implement any of the entities, components or services depicted in the examples of FIGS. 1-9 (and any other components described in this specification). The computing system 1000 may include one or more central processing units ("processors") 1005, memory 1010, input/output devices 1025 (e.g., keyboard and pointing devices, display devices), storage devices 1020 (e.g., disk drives), and network adapters 1030 (e.g., network interfaces) that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1010 and storage devices 1020 are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 1010 can be implemented as software and/or firmware to program the processor(s) 1005 to carry out actions described above. In some embodiments, such software or firmware may be initially provided to the processing system 1000 by downloading it from a remote system through the computing system 1000 (e.g., via network adapter 1030).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A method performed by a computing system, comprising:

receiving a registration request from an application service executing on multiple application server computing devices, the application service managing a dataset associated with multiple users of the application service as multiple shards, wherein a shard of the multiple shards includes the dataset associated with a subset of the users;

assigning a first set of the multiple shards to a first application server computing device of the multiple application server computing devices and a second set of the shards to a second application server computing device of the multiple application server computing devices, wherein assigning the first set of the shards includes adjusting shard assignment of the first application server computing device by reassigning one or more shards from or to the first application server computing device as a function of at least one of an available capacity of the first application server computing device or a computing resource requirement of any shard of the first set of shards;

generating a server-to-shard mapping, the server-to-shard mapping having a first identification information of the first application server computing device and a second identification information of the first set of the shards;

publishing the server-to-shard mapping to a configuration service executing on a configuration service computing device that is referred to by a client computing device for accessing the application service; and transmitting, by the configuration service and to the client computing device, identification information of a specified application server computing device of the application server computing devices to which the client computing device is to send a data access request, the specified application server determined using the server-to-shard mapping and based on a specified shard of the shards with which a user of the client computing device is associated, the specified shard determined based on a user identification (ID) of the user.

2. The method of claim 1, wherein the transmitting includes:

receiving, at the configuration service, a request from the client computing device for the identification information of the specified application server computing device.

3. The method of claim 2 further comprising:

receiving, at the specified application server computing device, the data access request from the client; and accessing, by the specified application server computing device, the specified shard to respond to the data access request of the client.

4. The method of claim 1, wherein assigning the first set of the shards to the first application server computing device includes:

designating one of the application server computing devices as a primary server for the first set of the shards, the primary server configured to provide a read access and/or write access to the first set of shards, wherein the first application server computing device is the primary server.

5. The method of claim 1, wherein assigning the first set of the shards to the first application server computing device further includes:

designating one or more of the application server computing devices as a secondary server for the first set of the shards, the secondary server configured to provide a read-only access to the first set of shards.

6. The method of claim 1, wherein assigning the first set of the shards to the first application server computing device further includes:

polling a counter in the first application server computing device to obtain load information, the load information including a first value that indicates an available capacity of the first application server computing device and a second value that indicates a computing resource requirement for a shard of the first set of the shards.

7. The method of claim 6 further comprising:
confirming, based on the first value and the second value, that the available capacity is below a minimum threshold; and
moving a specified shard of the first set of the shards from the first application server computing device to a third application server computing device of the application server computing devices.

8. The method of claim 7, wherein moving the specified shard includes:
dropping the specified shard from the first application server computing device, the dropping including identifying the specified shard based on a first specified technique, and
adding the specified shard to the third application server computing device, the adding including identifying the third application server computing device based on a second specified technique.

9. The method of claim 8, wherein identifying the specified shard based on the first specified technique includes:
identifying a given shard whose computing resource requirement is least among computing resource requirements of a subset of the first set of the shards each of which when removed increases the available capacity of the first application server computing device above the minimum threshold, as the specified shard.

10. The method of claim 8, wherein identifying the third application server computing device based on the second specified technique includes:
identifying a specified application server computing device whose available capacity is least among available capacities of a subset of the application server computing devices to which, when the specified shard is added does not drop their corresponding available capacity below the minimum threshold, as the third application server computing device.

11. The method of claim 6, wherein polling the counter in the first application server computing device includes obtaining identification information of the counter from the application service.

12. The method of claim 1 further comprising:
receiving an indication that the application service has a group of shards that needs to be assigned to one or more of the application server computing devices;
polling a counter of the application server computing devices to obtain load information indicating available capacities of the application server computing devices;
assigning the group of shards to one or more of the application server computing devices as a function of a computing resource requirement for a shard of the group of shards and available capacities of the application server computing devices.

13. The method of claim 12, wherein assigning the group of shards to the one or more of the application server computing devices includes:
assigning a specified shard of the group of shards whose computing resource requirement is highest among that of the group of shards to one of the application server computing devices that has a highest available capacity.

14. A non-transitory computer-readable storage medium storing computer-readable instructions, comprising:
instructions for assigning multiple shards associated with an application service to multiple application server computing devices on which the application service is hosted, wherein the shards represent a dataset associated with the application service, wherein a shard of the shards contains a subset of the dataset;
instructions for publishing a server-shard map containing assignments of the shards to the application server computing devices to a configuration service executing on configuration server computing device;
instructions for polling multiple counters of the application server computing devices to obtain load information of the application server computing devices, wherein load information of a first application server computing device of the application server computing devices indicates an available capacity of the first application server computing device and a computer resource requirement for a shard of a subset of the shards assigned to the first application server computing device; and
instructions for performing load balancing operations on the first application server computing device based on the load information to update an assignment of the shards to the application server computing devices.

15. The non-transitory computer-readable storage medium of claim 14, wherein the instructions for performing the load balancing operations includes:
instructions for confirming, based on load information of the first application server computing device, that the available capacity is below a minimum threshold; and
instructions for moving a specified shard of the subset of the shards from the first application server computing device to a second application server computing device of the application server computing devices.

16. The non-transitory computer-readable storage medium of claim 15, wherein the instructions for moving the specified shard includes:
instructions for dropping the specified shard from the first application server computing device, wherein after the specified shard is dropped, the available capacity is above the minimum threshold, and
instructions for adding the specified shard to the second application server computing device, wherein after adding the specified shard, an available capacity the second application server computing device does not drop below a first minimum threshold.

17. The non-transitory computer-readable storage medium of claim 14, wherein the instructions for performing the load balancing operations includes:
instructions for assigning a group of shards to one or more of the application server computing devices, the assigning the group of shards to the one or more of the application server computing devices includes assigning a specified shard of the group of shards whose computing resource requirement is highest among that of the group of shards to one of the application server computing devices that has a highest available capacity.

18. The non-transitory computer-readable storage medium of claim 14, wherein the instructions for assigning the shards to the application server computing devices include:
instructions for assigning the shards to the application server computing devices based on a locale-based assignment policy, the locale-based assignment policy ensuring that a set of the shards is assigned to one or more of the application server computing devices in a specified locale.

19. A system, comprising:
a processor;
a memory;

a first module configured to register an application service executing on multiple application server computing devices with the system, the application service managing a dataset associated with the application service as multiple shards, wherein a shard of the shards contains a subset of the dataset;

a second module configured to assign a first set of the shards to a first application server computing device of the application server computing devices and a second set of the shards to a second application server computing device of the application server computing devices, wherein the second module is configured to assign the first set of the shards by adjusting shard assignment of the first application server computing device, the adjusting including reassigning one or more shards from or to the first application server computing device as a function of at least one of an available capacity of the first application server computing device or a computing resource requirement of any shard of the first set of shards;

a third module configured to generate a server-shard mapping, the server-shard mapping containing a first identification information of an application server computing device of the application server computing devices, and a second identification information of a set of the shards that are assigned to the application server computing device; and a fourth module configured to publish the server-shard mapping to a configuration service executing on a configuration service computing device that is referred to by a client for accessing the application service, wherein the configuration service computing device is further configured to:

transmit, to the client, identification information of a specified application server computing device to which the client is to send a data access request, the specified application server determined using the server-shard mapping and based on a specified shard of the shards with which a user of the client is associated, the specified shard determined based on a user ID of the user.

20. The system of claim 19, wherein the configuration service computing device is configured to receive a request from the client for the identification information of the specified application server computing device.

* * * * *

UNITED STATES PATENT AND TRADEMARK OFFICE
CERTIFICATE OF CORRECTION

PATENT NO. : 9,906,589 B2  
APPLICATION NO. : 14/542106  
DATED : February 27, 2018  
INVENTOR(S) : Kathuria et al.

Page 1 of 1

It is certified that error appears in the above-identified patent and that said Letters Patent is hereby corrected as shown below:

On the Title Page

In Item (54), under "Title", in Column 1, Line 1, delete "SHARED" and insert -- SHARD --, therefor.

In the Claims

In Column 18, Line 41, in Claim 16, delete "capacity the" and insert -- capacity of the --, therefor.

Signed and Sealed this  
Eleventh Day of June, 2019

Andrei Iancu  
*Director of the United States Patent and Trademark Office*